Nov. 1, 1960
C. GERST
2,958,231
MULTI-SPEED FORWARD AND REVERSE STEERING TYPE TRANSMISSION AND AXLE
Filed Sept. 8, 1958
9 Sheets-Sheet 3
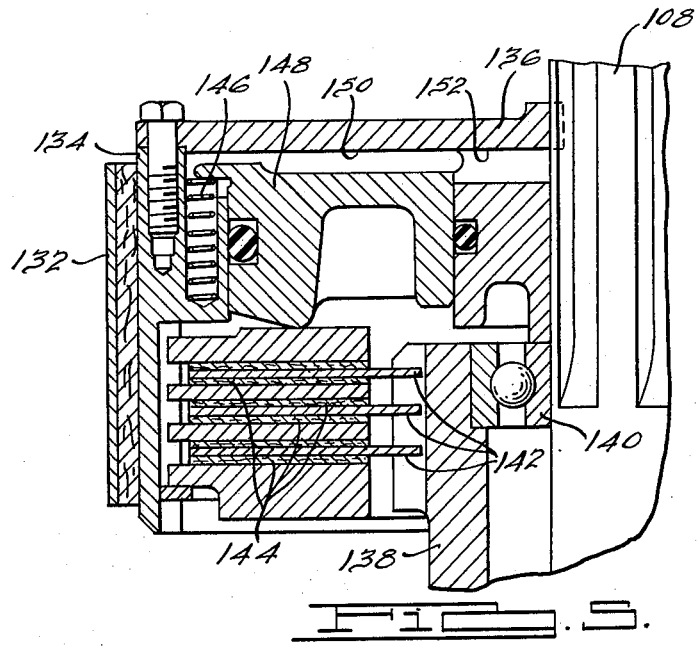
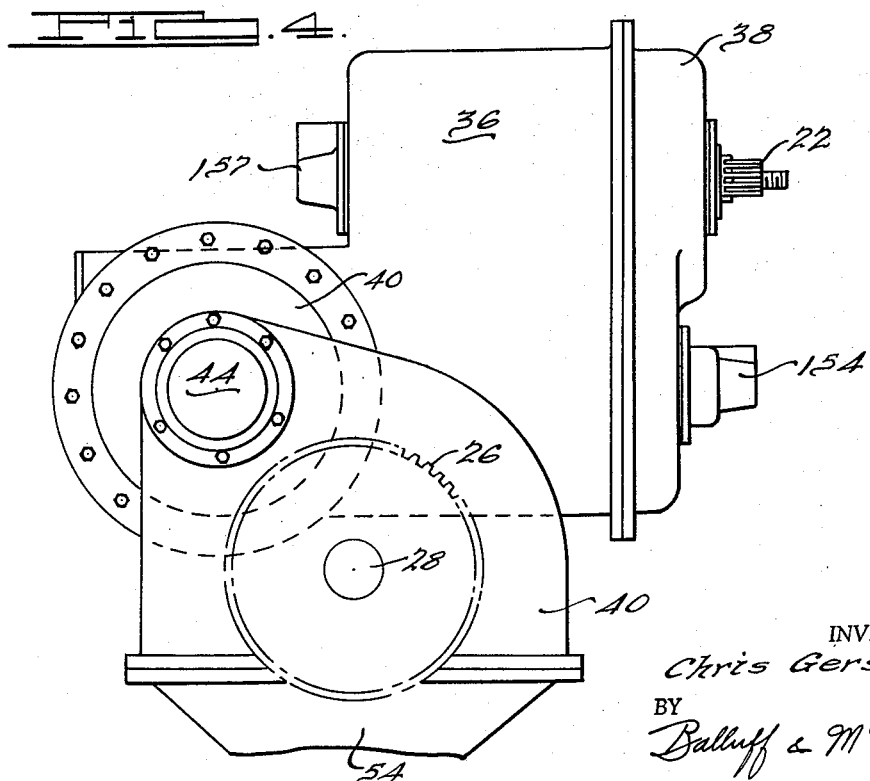
INVENTOR.
Chris Gerst.
BY
Balluff & McKinley
ATTORNEYS.

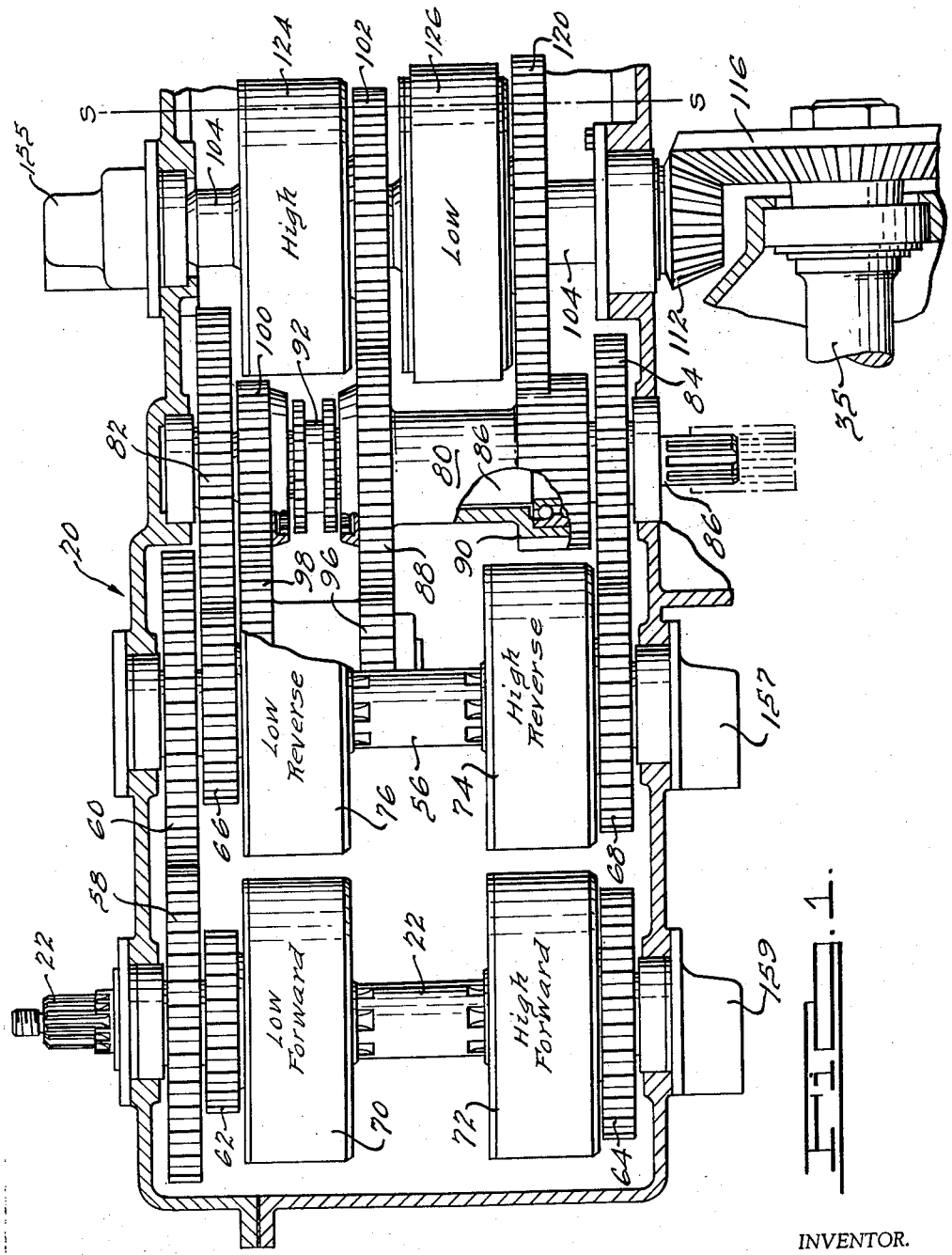

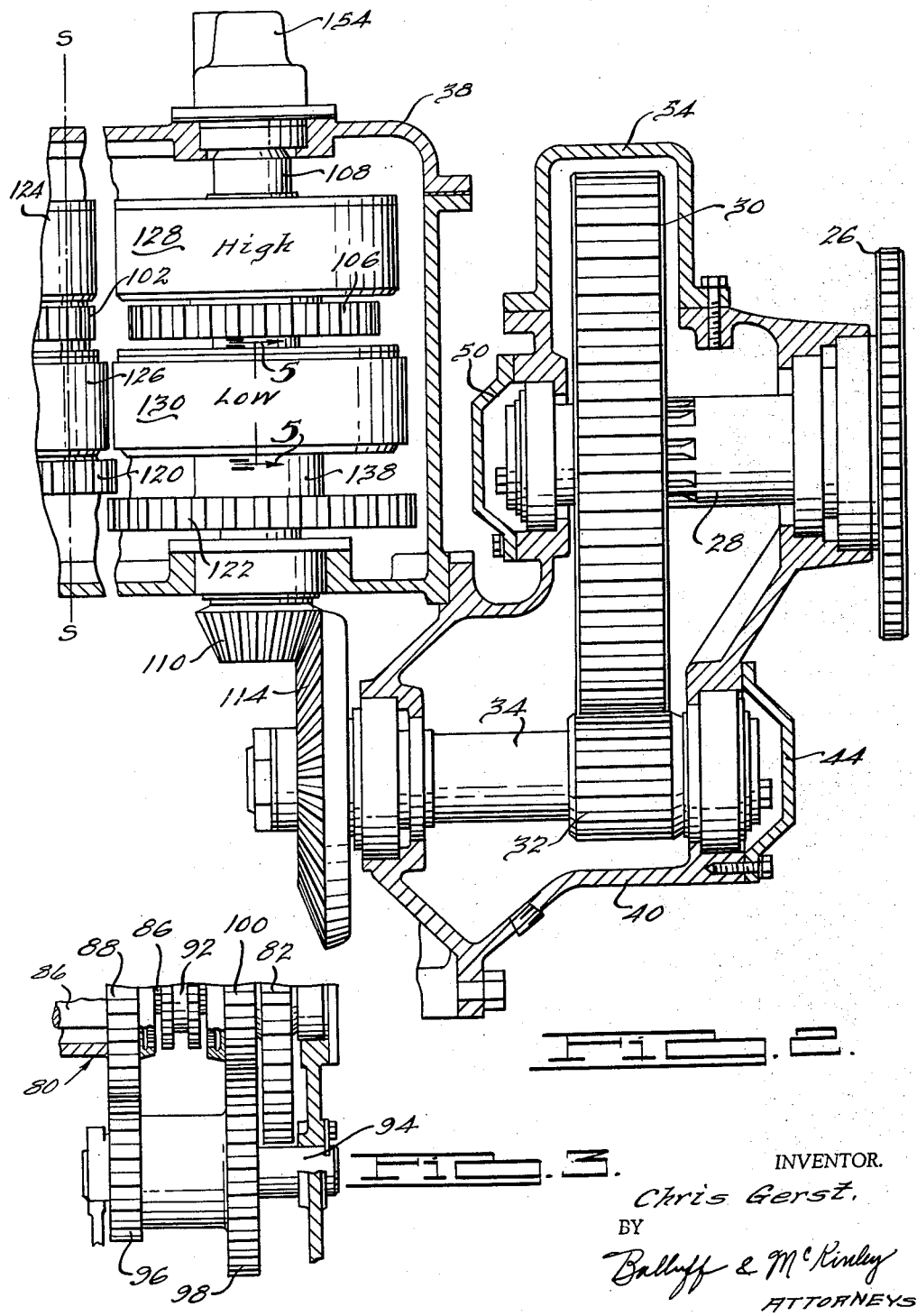

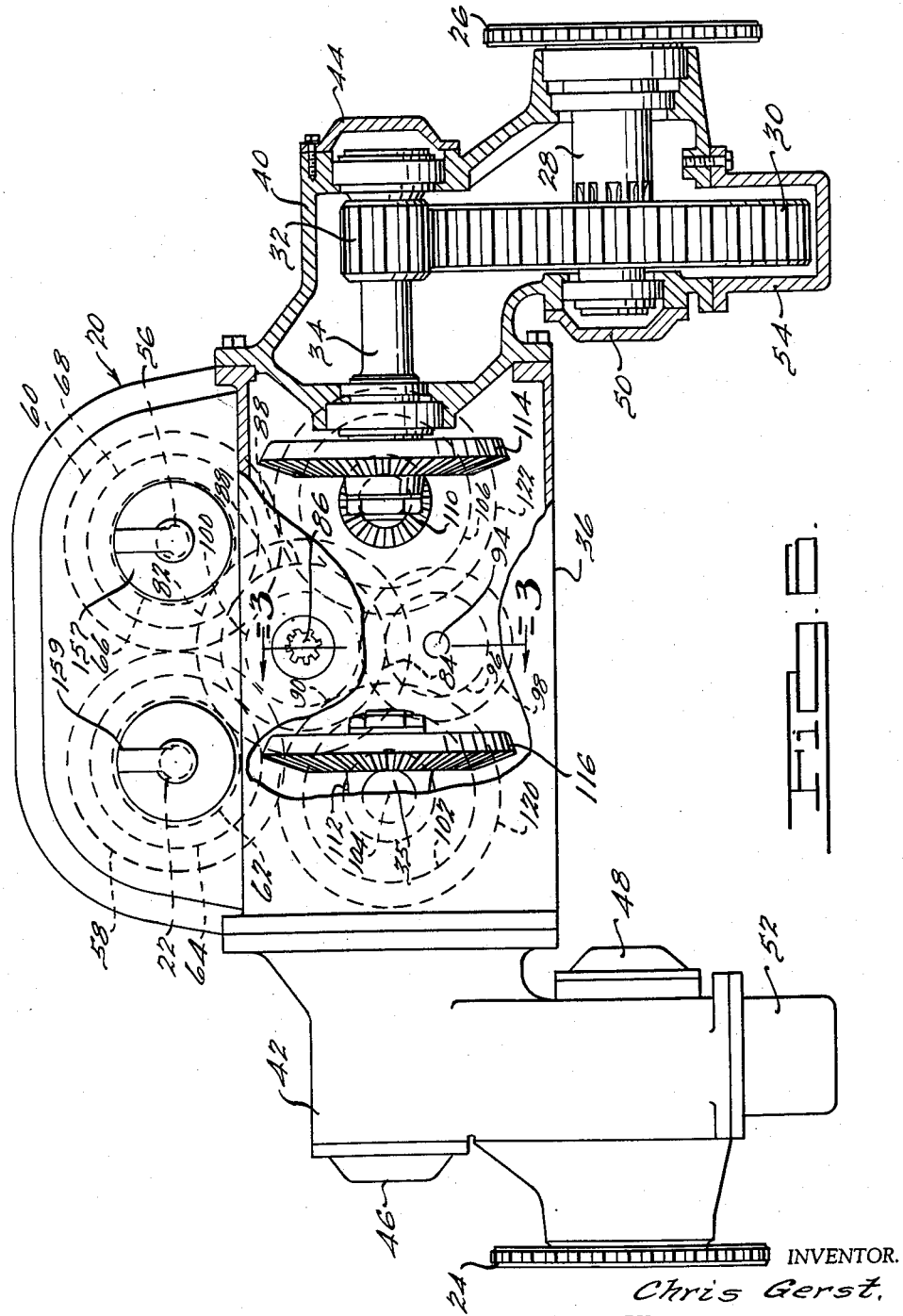

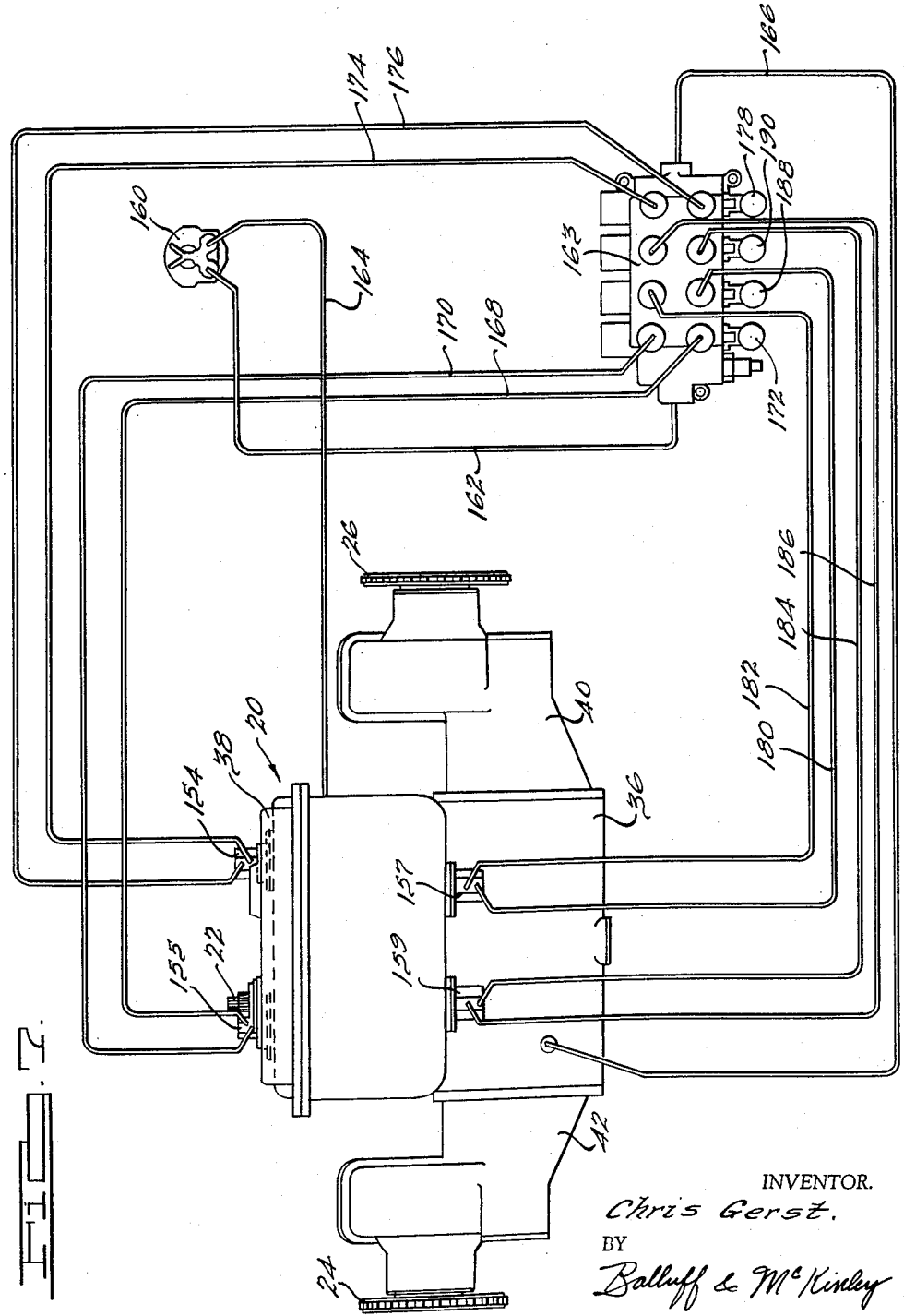

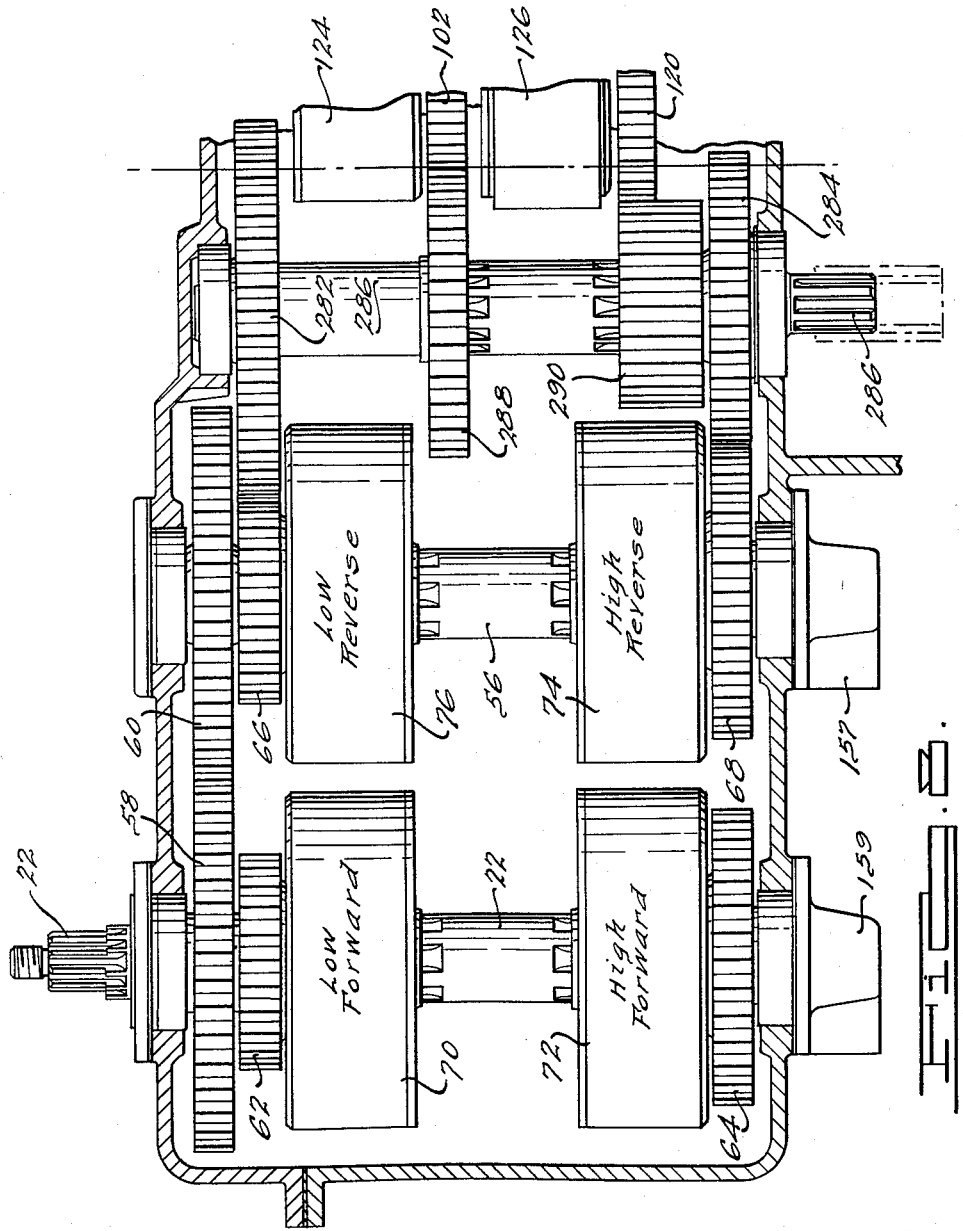

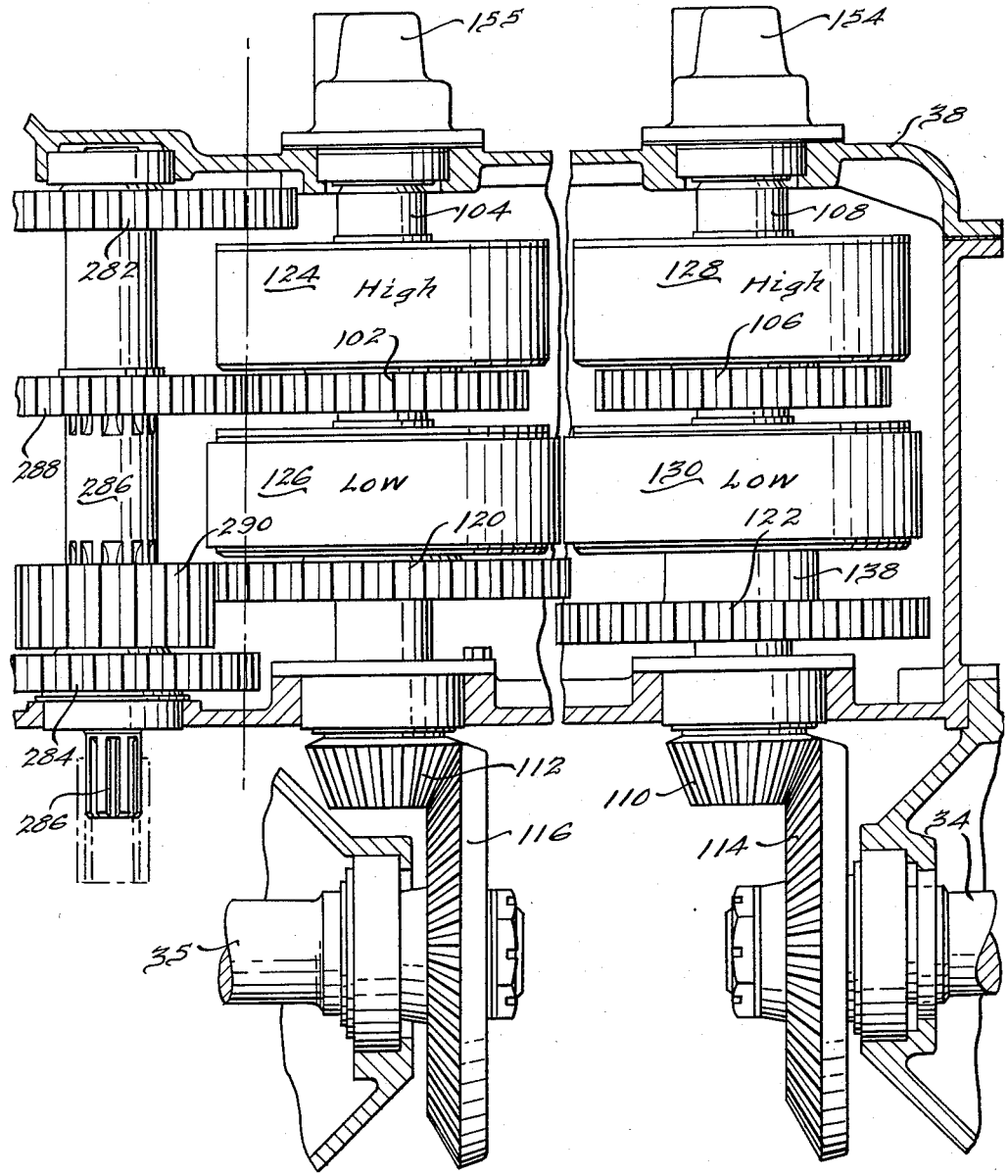

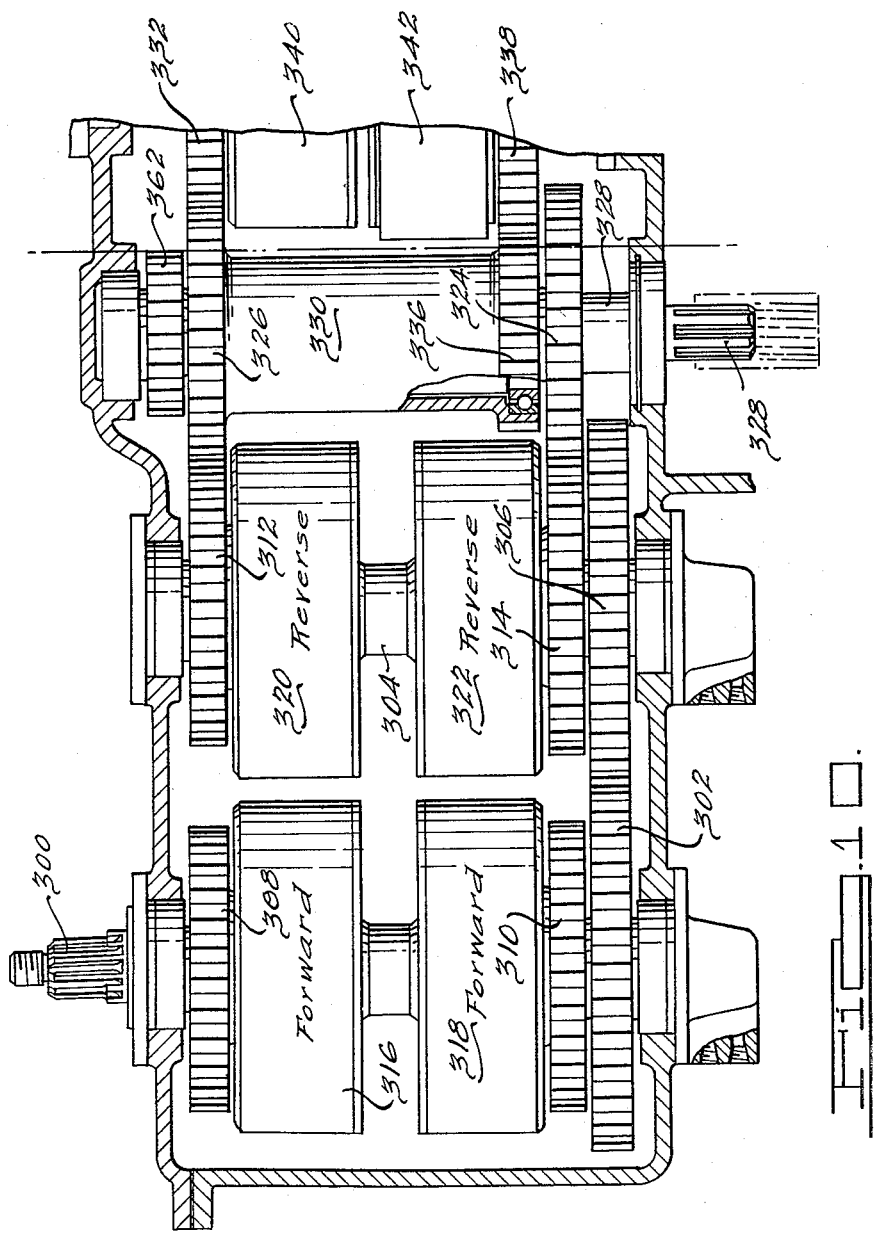

United States Patent Office 2,958,231
Patented Nov. 1, 1960

2,958,231

MULTI-SPEED FORWARD AND REVERSE STEERING TYPE TRANSMISSION AND AXLE

Chris Gerst, 19303 W. Davison, Detroit 23, Mich.

Filed Sept. 8, 1958, Ser. No. 759,655

30 Claims. (Cl. 74—360)

This invention relates to multispeed forward and reverse steering type transmission and axle assemblies of the type useful in tractors.

An object of the invention is to provide a transmission and axle of this type which is relatively simple in design, which is compact, and which is relatively inexpensive to produce compared with conventional transmission and axles of this type.

Another object of the invention is to provide a basic design for a transmission and axle of this type which readily lends itself to variations, thus making it possible to produce a series of models with different characteristics and features so as to meet a wide variety of requirements without having to duplicate the tooling for each model.

Other and further objects of the invention will be apparent from the following description and claims and may be understood by reference to the accompanying drawings, of which there are nine sheets, which by way of illustration show preferred embodiments of the invention and what I now consider to be the best mode in which I have contemplated applying the principles of my invention. Other embodiments of the invention may be used without departing from the scope of the present invention as set forth in the appended claims.

In the drawings:

Fig. 1 is a fragmentary, sectional, developed view of an eight-speed forward and reverse steering type transmission and axle embodying the invention;

Fig. 2 is a fragmentary, sectional, partially developed view of a further portion of the assembly illustrated in Fig. 1;

Fig. 3 is a fragmentary sectional view taken along the line 3—3 of Fig. 6;

Fig. 4 is a side elevational view of the assembly with parts broken away;

Fig. 5 is an enlarged fragmentary sectional view of one of the hydraulically actuated multiple disc clutches incorporated in the assembly and taken along the line 5—5 of Fig. 2;

Fig. 6 is a rear elevational view, partly broken away, on a reduced scale, of the transmission and axle assembly shown in Figs. 1 to 5;

Fig. 7 is a plan view of the transmission and axle assembly on a reduced scale, with the hydraulic control system therefor illustrated schematically;

Fig. 8 is a fragmentary, sectional, partially developed view of a four-speed forward and reverse steering type transmission and axle;

Fig. 9 is a fragmentary, sectional, partially developed view of a further portion of the assembly shown in Fig. 8;

Fig. 10 is a fragmentary, sectional, partially developed view of a two-speed forward and reverse counterrotating type of transmission and axle embodying the invention.

Figure 11:
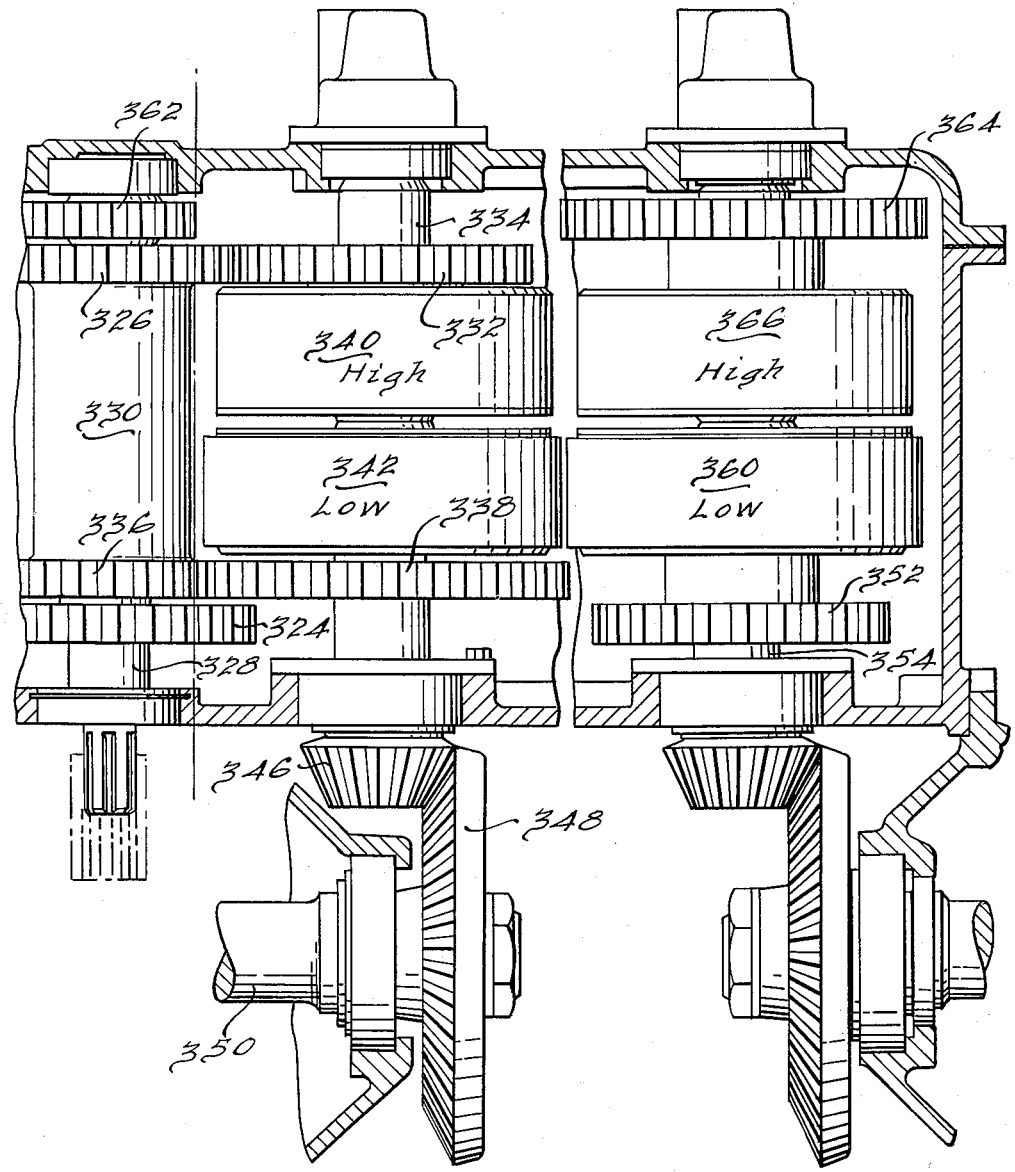
Fig. 11 is a fragmentary, sectional, partially developed view showing further portions of the assembly illustrated in Fig. 10.

As illustrated in Figs. 6 and 7, the eight-speed forward and reverse steering type transmission and axle comprises in general a housing or casing 20 provided with an input shaft 22 and a pair of driving sprockets 24 and 26, each sprocket being mounted on a stub axle 28, the right-hand one of which is shown in Fig. 6. The axles 28 are axially aligned and project from the opposite sides of the housing 20 where each axle has affixed thereto one of the driving sprockets 24 or 26. The axles 28 are suitably journaled in bearings in the housing and each has a gear 30 splined thereto for driving the same, the teeth of each gear 30 being in mesh with the teeth of a pinion 32 which is fixed to a shaft 34 for rotation therewith. For purposes of identification, the shaft 34 as shown in Fig. 6, or its counterpart 35 as shown in Fig. 1, may sometimes be referred to as the output shaft, although it will be understood that the axles 28 are the final output shafts of the transmission as illustrated in Figs. 1 to 7. It will be understood that each sprocket 26 or 24 is adapted to drive the track (not shown) on one side of the tractor. Obviously the transmission may be used on a wheel type of tractor where wheels would be connected to the axles 28 instead of the sprockets 24 and 26.

The housing 20 is built up out of a plurality of castings which, as illustrated, comprise a main section 36, a cover 38 therefor, axle housing sections 40 and 42, and removable covers 44, 46, 48, 50, 52 and 54 which close certain openings in the axle housing sections 40 and 42. The housing 20 provides a lubricant containing housing and rigid support and enclosure for the bearings and other working parts of the transmission and axle.

The input shaft 22 is suitably connected to the engine of the tractor and as the transmission and axle assembly incorporates reversing mechanism, the input shaft 22 need be driven in one direction only. The transmission and axle comprises in general clutch controlled, selectively operable, forward and reverse gearing driven by by the input shaft (Fig. 1), double distributor or counter shafts 80, 86 and associated gearing (Fig. 1), and high and low speed clutch controlled gearing for each of the output shafts 34 and 35 (Figs. 1 and 2). The clutch controlled, selectively operable forward and reverse gearing associated with the input shaft 22 is shown in Fig. 1 and comprises parallel shafts 22 and 56 geared together by the gears 58 and 60 for simultaneous rotation in opposite directions. The gear 58 is splined to the shaft 22 while the gear 60 is splined to the shaft 56, and the shaft 22 as disclosed projects from the transmission for connection with the engine. The shaft 22 has a low speed forward gear 62 and a high speed forward gear 64 rotatably journaled thereon, while shaft 56 has a low speed reverse gear 66 and a high speed reverse gear 68 rotatably journaled thereon. The shaft 22 has a normally disengaged hydraulically actuated multiple disc clutch 70 thereon operatively disposed between the gear 62 and the shaft 22 and which is adapted when engaged to couple the shaft 22 with the gear 62 for driving the same. Like clutches 72, 74 and 76 are provided for the gears 64, 66, and 68 respectively for selectively coupling each of such gears to the shaft on which it is journaled.

Figs. 1 and 2 show the transmission parts in a developed position, but in fact the shafts 22 and 56 are so disposed (Fig. 6) with respect to the distributor shafts 80, 86 that each of the gears 62 and 66 is in constant mesh with the gear 82 splined to the inner distributor shaft 86. Likewise, the gears 64 and 68 are each in constant mesh with the other gear 84 splined to the inner distributor shaft 86. Thus, depending upon which of the clutches 70, 72, 74 and 76 are engaged, the inner shaft 86 and the set of gears 82 and 84 fixed thereto will be driven in either a forward or reverse direction and at a relatively high or low speed from the shaft 22. The projecting end of the shaft 86 may be utilized as a power take-off shaft. The shafts 22, 56 and 86 are all suitably journaled in bearings in the transmission housing 20, and outer distributor shaft 80 is journaled on inner shaft 86 so as to be rotatable relative thereto.

The distributor gearing also includes a set of gears or double gear 88 and 90 formed integrally with the outer tubular shaft 80, a shiftable double clutch member 92 slidably splined on the shaft 86, and a double gear 96, 98 journaled on a stationary axle 94, the teeth of gear 96 being in mesh with gear 88, while the teeth of gear 98 mesh with the teeth of gear 100 which is rotatably journaled on the shaft 86. The hub of the gear 100 is provided with inner clutch teeth adapted to mesh with one of the sets of clutch teeth of the clutch member 92 so as to couple the gear 100 to the shaft 86 to be driven thereby, thus driving the gears 88, 90 and shaft 80 at a rate of speed less than that of the shaft 86. The clutch member 92 is shown in its neutral position in Fig. 1 and is shiftable by means (not shown) in one direction so as to couple one of the sets of clutch teeth thereof with the clutch teeth on the gear 100 for the purpose just described. In addition, the clutch member 92 is shiftable in the opposite direction from its neutral position to mate the other set of clutch teeth thereon with internal clutch teeth provided on the hub of the gear 88 so as to couple the gear 88 directly to the shaft 86 for rotation therewith.

The distributor shafts 80, 86 and their associated gearing are so disposed that the teeth of the gear 88 are in constant mesh with the teeth of the gear 102 journaled on a shaft 104 and also in constant mesh with the teeth of a gear 106 journaled on a shaft 108. The shafts 104 and 108 are disposed in parallel to each other and to the shaft 86 and are each provided with a bevel pinion 110 and 112, the pinion 110 mating with the teeth of a bevel gear 114 fixed on the rotatable shaft 34, while the pinion 112 mates with the teeth of a bevel pinion 116 fixed on the rotatable shaft 35. The teeth of the gear 90 mesh with a low speed gear 120 journaled on the shaft 104 and also with the teeth of a low speed gear 122 journaled on the shaft 108.

A normally disengaged, hydraulically actuated, multiple disc clutch 124 is operatively disposed between the gear 102 and the shaft 104 for coupling the same together when the clutch 124 is engaged. In addition, like clutches 126, 128 and 130 are operatively associated with the gears 120, 106 and 122, respectively, for selectively coupling such gears with the shafts on which they are mounted. The clutches 124, 126, 128 and 130 are all selectively controlled so that either of the clutches 124 or 126 and/or either of the clutches 128 and 130 may be engaged. Thus, it will be apparent that depending upon the engagement or disengagement of the clutches 124, 126, 128 and 130, the shafts 34 and 35 may be driven at the same or different speeds in each direction, or that one of the shafts 34 or 35 may be driven while the other is not.

Each of the clutches 126 and 130 also comprises a part of a normally disengaged brake whereby the shaft to which the annular drum of each of such clutches is splined may be held against rotation by engagement of the brake. The brakes are of the band type conventionally employed. As shown in Fig. 5, which is a section through the clutch 130 and its associated brake, the brake comprises a contractible annular friction brake band 132 surrounding the cylindrical braking surface provided by the outer surface of the drum 134, the hub 136 of which is splined to the shaft 108 so that the drum 134 will rotate with the shaft 108. The band 132 is not rotatable and normally is disengaged, that is, free of the drum 134 so as not to prevent or retard the rotation thereof. However, suitable means (not shown) are provided for clamping the band 132 to the drum 134 so as to arrest the rotation thereof, thereby holding the shaft 108 and the parts coupled therewith or geared thereto against rotation.

In addition to functioning as a part of the brake, the drum 134 also forms a driven part of the clutch, the driving part of which is provided by a hub 138 integral with the gear 122 which is normally free on the shaft. The ballbearing 140 is one of the bearings which journal the gear 122 on the shaft 108. The hub 138 of the gear 122 projects inside of the drum 134 where it is provided with a series of annular clutch discs 142 interleaved with a series of annular clutch discs 144 which are affixed to the drum 134 for rotation therewith. As previously indicated, the clutches are normally disengaged and the clutch discs run free with respect to each other. The clutch construction herein disclosed is essentially that disclosed and claimed in my prior application Serial No. 530,025, filed August 23, 1955, for "Hydraulically Actuated Multiple Disc Clutch," now Patent No. 2,880,834.

A series of springs 146 disposed around the drum 134 react on the drum and an annular piston 148 which is reciprocal in an annular hydraulic cylinder 150. When fluid under pressure is supplied to the cylinder 150, the annular piston will react against the stack of clutch discs 142, 144 and apply pressure to the same so as to engage the clutch. However, as soon as the hydraulic pressure is released, the springs 146 function to move the piston 148 in a direction to relieve the pressure on the clutch discs and thereby permit the prompt disengagement of the clutch. Fluid under pressure is supplied to the cylinder through a duct 152 in the hub 136 and this duct 152 communicates with a duct in the shaft 108 (not shown) through which fluid under pressure is supplied to the clutch. The construction and operation of each of the multiple disc clutches are the same except that two of them have brake bands 132 associated therewith, and thus in addition form a part of the brake mechanism. Operator controlled means are provided for effecting operation, i.e., application of each of the brakes when desired.

The shaft 108 extends outside of the transmission housing where it is provided with a cap 154 to which fluid pressure lines are suitably connected for supplying pressure fluid to the clutches 128 and 130 through the ducts in shaft 108. Likewise, the other clutch shafts are provided with similar caps and ducts through which fluid under pressure is supplied to the clutches thereon for engaging the same.

Fig. 7 is a schematic hydraulic diagram of the pressure system for controlling the clutches. A fluid pressure pump 160 is adapted to supply fluid at a suitable pressure through line 162 to a conventional multiple valve assembly 163, the pump 160 being connected by line 164 to a lubricant reservoir in the transmission housing which provides a supply of pressure fluid for the pump 160. In addition, a return line 166 extending between the valve assembly and the housing returns excess fluid to the transmission housing. All of the clutches normally are disengaged, and after being engaged will return to disengaged position as soon as the fluid pressure is released.

The valve assembly is connected by lines 168 and 170 to the cap 155 secured to the outer end of the shaft 104. The fluid pressure line 168 communicates with the duct in the shaft 104 which supplies fluid pressure to the clutch 124, while the fluid pressure line 170 communicates with the duct in the shaft 104 which supplies fluid under pressure to the clutch 126. The valve assembly includes a clutch control valve having a shiftable valve member (not shown) controlled by a handle 172, shown in neutral position, which is adapted when the handle 172 is moved in one direction from neutral to port the fluid pressure line 168 to the supply of pressure fluid in the valve assembly housing, and when the handle 172 is shifted in the opposite direction from neutral, to port the fluid pressure in the valve assembly housing to the fluid pressure line 170. It will be evident, therefore, that the clutches 124 and 126 may be alternately engaged by manipulation of handle 172, or both disengaged, but both cannot be engaged at the same time.

Fluid pressure lines 174 and 176 lead from the valve assembly to the cap 154 on the end of the shaft 108 for supplying fluid pressure to the clutches 128 and 130, and these fluid pressure lines are controlled by a handle 178 actuated movable valve member (not shown) like that controlled by handle 172. Similarly, fluid pressure lines 180 and 182 connect the valve assembly 163 with the cap 157 on shaft 56 so as to control the high and low speed reverse clutches 74 and 76 on the shaft 56, while fluid pressure lines 184 and 186 connect the valve assembly with the cap 159 on the shaft 22 so as to supply fluid under pressure under the control of the valve assembly to the high and low speed forward clutches 72 and 70 on the shaft 22. The handles 172, 178, 188 and 190 for the valves of the assembly 163 are all shown in their neutral position. The clutches on each shaft can only be engaged alternately since each valve of the assembly 163 is so designed and controlled by its handle that only one of the fluid pressure lines controlled thereby can be ported to the fluid pressure in the valve assembly at one time and so that the valve is normally positioned in a neutral position which serves to relieve the fluid pressure in the lines and thereby permits the disengagement of the clutches. In disengaging one clutch on a shaft and before engaging the other clutch on the same shaft it will be necessary for the shiftable valve member to move to and through its neutral position.

Thus by engaging clutches 70, 124 and 128 with the clutch member 92 shifted so as to couple the clutch teeth thereof with the clutch teeth of the gear 100, the drive to one of the axles 28 will be from shaft 22 through clutch 70, gear 62, gear 82, shaft 86, clutch member 92, gear 100, gear 98, gear 96, gear 88, gear 102, clutch member 124, shaft 104, pinion gear 112, bevel gear 116, and shaft 35 to the axle on one side, while the drive to the other side will be from gear 88 through gear 106, clutch 128, shaft 108, bevel pinion 110, bevel gear 114, and shaft 34 to the axle 28. Through control of the clutches 124, 126, 128 and 130 the drive to one axle 28 may be at a different speed in the same direction than that to the other axle 28. In addition, by disengaging one of such clutches, the drive to one side may be interrupted, and by applying the brake associated with the clutch 126 or the clutch 130 the axle on such side may be held against rotation.

The transmission shown in Figs. 8 and 9 is a four-speed forward and reverse steering type transmission and axle assembly and is very similar to the one just described. In fact, it is the same as to all of its parts with the exception that only a single distributor shaft is employed. The transmission of Figs. 1 to 7 employs double distributor shafts 80, 86 wherein the outer shaft 80 is rotatable on the inner shaft 86 and may be driven through the countergears 96, 98 at a lower speed than the shaft 86, or may be driven at the same speed as the shaft 86 if the clutch member 92 directly couples the clutch teeth of the gear 88 to the shaft 86.

In the transmission and axle of Figs. 8 and 9, the single distributor or counter shaft 286 is employed in lieu of the shafts 80, 86 of Fig. 1. Shaft 286 is provided with gear 290 corresponding with the gear 90, a gear 288 corresponding with the gear 88, and a gear 282 corresponding with the gear 82 of Fig. 1. Except for the single shaft 286 and the fact that the gears 282, 288 and 290 are splined to the shaft 286, the construction of the transmission shown in Figs. 8 and 9 is the same as that previously described, and accordingly like reference characters are used in Figs. 8 and 9 on parts which correspond with like parts in the previous modification. However, it should be noted that the transmission and axle assembly of Figs. 8 and 9 is but a four-speed forward and reverse steering type mechanism, whereas that of Figs. 1 to 7 is an eight-speed.

Thus, the gear 282 is in constant mesh with the gears 62 and 66, while the gear 284 which corresponds with the gear 84 of Fig. 1 is in constant mesh with the gears 64 and 68, the gear 284 being splined to the shaft 286 so as to rotate therewith. The gear 288, like the gear 88, is in mesh with the teeth of gears 102 and 106, while the gear 290 is in mesh with the teeth of gears 120 and 122. Gears 282 and 284 form a set for power driving shaft 286 while gears 288 and 290 form another set power driven by shaft 286.

A rear elevational view of the transmission shown in Figs. 8 and 9 is the same as that shown in Fig. 6 except for the omitted parts, such as the countershaft 94 and its associated gearing and gear 100. The hydraulic control system illustrated in Fig. 7 is equally applicable to the transmission and axle assembly shown in Figs. 8 and 9 as this transmission, like that of Figs. 1 to 7, includes eight normally disengaged, hydraulically actuated, multiple disc clutches. Thus by substitution of the single distributor shaft 286 for the double shafts 80, 86, and the omission of the double gear 96, 98 of Fig. 1, a four-speed forward and reverse steering type transmission and axle assembly can be provided instead of the eight-speed arrangement shown in Figs. 1 to 7. In addition, the number of available gear ratios, i.e., speeds, can be halved by omission of a set of forward and reverse clutches and associated gears, such as 72, 74, 64, 68, and the gear 284 on the distributor shaft driven thereby.

The transmission and axle shown in Figs. 10 and 11 is a two-speed forward and reverse counter-rotating type of transmission; that is, in this transmission the axles 28 may be driven simultaneously in the same or in reverse directions at the same or different speeds. Here again many of the parts are the same as those of the transmissions in the previous modifications. In the transmission and axle assembly of Figs. 10 and 11 the input shaft 300 has gear 302 splined thereon, while shaft 304 disposed parallel to shaft 300 has gear 306 splined thereon. The gears 302 and 306 are in constant mesh so that the shafts 300, 304 will rotate simultaneously in opposite directions. The shaft 300 has gears 308 and 310 journaled thereon, while the shaft 304 has reverse gears 312 and 314 journaled thereon. Normally disengaged, hydraulically actuated, multiple disc clutches 316, 318, 320 and 322, like those previously described, are operatively associated with the gears 308, 310, 312 and 314 and shafts 300, 304, and are adapted when engaged to couple each of the gears to the shaft upon which such gear rotates. However, since the gears 308 and 310 provide for forward drive while gears 312 and 314 provide for reverse drive, and since the gears 310 and 314 are in constant mesh with the same gear 324 splined on the inner distributor or counter shaft 328, while the gears 308 and 312 are in constant mesh with the same gear 326 integral with the outer distributor or counter shaft 330, it will be evident that the clutches 316 and 320 will be alternately engageable, while the clutches 318 and 322 will be alternately engageable.

In this modification the inner distributor shaft 328 has a set of gears 324 and 362 fixed thereon and the outer tubular distributor shaft 330 rotatably journaled thereon is formed with an integral set of gears 326 and 336. Gear 326 is driven either from the gear 308 or the gear 312, while gear 324 on the shaft 328 may be driven either from the gear 310 or the gear 314, depending upon which of the clutches 316, 318, 320 and 322 is engaged.

The teeth of the gear 326 also mesh with the teeth of a high speed gear 322 journaled on the shaft 334, while the teeth of the other gear 336 of the outer shaft 330 mesh with the teeth of a low speed gear 338 also journaled on the shaft 332. A normally disengaged, hydraulically actuated, multiple disc clutch 340 is operatively arranged between the gear 332 and the shaft 334 and is adapted when engaged to couple the gear 332 to the shaft 334 for driving the same. Likewise, a similar clutch 342 is provided for coupling the gear 338 to the shaft 334, and the clutch 342 has a brake associated with it as in the case of the previous embodiments.

The shaft 334 is provided with a bevel pinion 346 which mates with the teeth of a bevel gear 348 on an output shaft 350 leading to the axle shaft on one side of the transmission and axle assembly, as in the case of previous modifications. In fact, the arrangement as illustrated in Figs. 10 and 11, except as indicated, is the same as that previously described. However, because of the different arrangement of the distributor shafts and the associated gearing, the transmission and axle of Figs. 10 and 11 is a counter-rotating type of transmission and axle, as distinguished from the transmission and axles of Figs. 1 to 9 wherein no counterrotation of the axles is provided. The gear 324 which is splined on the shaft 328 is in constant mesh with a gear 352 rotatably journaled on a shaft 354. A normally disengaged, hydraulically actuated, multiple disc clutch 360 is operatively disposed between the gear 352 and the shaft 354 and is adapted when engaged to couple the gear 352 to the shaft 354 for driving the same. The clutch 360, like the clutch 342, is provided with a brake. Another gear 362 splined to the shaft 328 meshes with a gear 364 which is rotatably journaled on shaft 354, and a normally disengaged, hydraulically actuated, multiple disc clutch 366 like that previously described is provided for coupling the gear 364 to the shaft 354 for driving the same.

Thus the gear 308, the clutch 316, the gear 312, the clutch 320, the gears 326 and 336, the gears 332 and 338 and their associated clutches, shaft 334, bevel pinion 346, bevel gear 348, and shaft 350 provide a drive to one of the driving axles of the assembly, while the remaining gears and clutches provide the drive to the other side. Thus the drive to one driving axle is independent of the drive to the other, except that they are both driven from the input shaft 300 and hence it is possible by selective control of the clutches to drive one of the driving axles at a different speed or in a different direction, or both, than the other.

A rear elevational view of the transmission and axle of Figs. 10 and 11 would be as shown in Fig. 6, except for the countershaft 94 and associated gearing. However, such an arrangement could be readily incorporated in the transmission and axle of Figs. 10 and 11, in which event such transmission would then be a four-speed forward and reverse transmission.

A hydraulic control system as illustrated in Fig. 7 may be employed for selectively controlling the clutches of the transmission and axle of Figs. 10 and 11.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. A transmission and axle comprising a pair of parallel driving shafts geared together for simultaneous rotation in opposite directions, each shaft having a first drive gear and a second drive gear rotatably journaled thereon and a normally disengaged, hydraulically actuated, multiple disc clutch operatively disposed between each of such gears and the shaft on which it is journaled, a distributor shaft having a double gear rotatable thereon, one of which is in constant mesh with the first drive gear on each of said shafts, and two gears fixed on said distributor shaft, one of which is in constant mesh with the second drive gear on each of said shafts, a first two-speed shaft having a high speed gear journaled thereon in constant mesh with one of the gears of said double gear and a low speed gear journaled thereon in constant mesh with the other of the gears of said double gear, a second two-speed shaft having a high speed gear journaled thereon in constant mesh with one of said two gears and a low speed gear journaled thereon in constant mesh with the other of said two gears, a normally disengaged, hydraulically actuated, multiple disc clutch operatively disposed between each of such high and low speed gears and the shaft on which it is journaled, each of said clutches being selectively engageable for selectively coupling each gear to the shaft on which it is journaled for rotation therewith, an axle geared to one of said two-speed shafts, and another axle geared to the other of said two-speed shafts, said axles being aligned.

2. A transmission and axle according to claim 1 wherein one of said clutches on each of said two-spaced shafts has a brake mechanism operatively associated therewith.

3. A transmission and axle comprising a pair of parallel driving shafts geared together for simultaneous rotation in opposite directions, each shaft having a first drive gear and a second drive gear rotatably journaled thereon, a distributor shaft having a first set of gears rotatable together thereon, and a second set of gears fixed thereon, one of the gears of said two sets of gears being arranged to be driven by the first gear on each of said parallel shafts and another of the gears of said two sets of gears being arranged to be driven by the second gear on each of said parallel shafts, a pair of multi-speed shafts, each having a high speed gear and a low speed gear journaled thereon adapted to be driven by the gears of one of said sets of gears, a normally disengaged clutch operatively disposed between each of such gears and the shaft on which it is journaled, said clutches being selectively engageable for selectively coupling each gear to the shaft on which it is journaled for rotation therewith, an axle geared to one of said multi-speed shafts, and another axle geared to the other of said multi-speed shafts.

4. A transmission and axle comprising a pair of parallel driving shafts geared together for simultaneous rotation in opposite directions, each shaft having first and second drive gears rotatably journaled thereon and adapted to be driven thereby, a distributor shaft having first and second sets of gears thereon, said distributor shaft gears being arranged to be driven by the drive gears on said parallel shafts, a first multi-speed shaft having a high speed gear journaled thereon adapted to be driven by one of the gears of said first set of gears and a low speed gear journaled thereon adapted to be driven by the other of the gears of said first set of gears, a second multi-speed shaft having a high speed gear journaled thereon adapted to be driven by one of the gears of said second set of gears and a low speed gear journaled thereon adapted to be driven by the other of the gears of said second set of gears, an axle geared to one of said multi-speed shafts, and another axle geared to the other of said multi-speed shafts.

5. A transmission and axle comprising a pair of parallel driving shafts geared together for simultaneous rotation in opposite directions, each shaft having a first drive gear and a second drive gear rotatably journaled thereon and a normally disengaged multiple disc clutch operatively disposed between each of such gears and the shaft on which it is journaled, said clutches being selectively engageable for selectively coupling each of said first and second gears to the shaft on which it is journaled for rotation therewith whereby each of said gears may be selectively driven directly by and with the shaft on which it is journaled, a distributor shaft having gears thereon one of which is arranged to be selectively driven by the first drive gear on each parallel shaft, and a second gear on the distributor shaft being arranged to be selectively driven by the second drive gear on each parallel shaft, a first shaft having a gear thereon arranged to be driven by one of the gears of said distributor shaft, a second shaft having a gear thereon arranged to be driven by another of the gears of said distributor shaft, an axle geared to one of said first and second shafts, and another axle geared to the other of said first and second shafts, said axles being aligned.

6. A transmission and axle comprising a pair of parallel shafts geared together for simultaneous rotation in opposite directions, each shaft having first and second drive gears rotatably journaled thereon and a normally disengaged multiple disc clutch for selectively coupling each of said gears to the shaft on which it is journaled for rotation therewith, a first set of gears, one of which is in mesh with the first drive gear on each parallel shaft, and a second set of gears, one of which is in mesh with the second drive gear on each of said parallel shafts, a first two-speed shaft having a high speed gear adapted to be driven by one of the gears of said first set of gears and a low speed gear adapted to be driven by the other of the gears of said first set, a second two-speed shaft having a high speed gear adapted to be driven by one of the gears of said second set of gears and a low speed gear adapted to be driven by the other of the gears of said set, an output shaft geared to one of said two-speed shafts, and another output shaft geared to the other of said two-speed shafts, said output shafts being aligned.

7. A transmission and axle according to claim 6 wherein said sets of gears are disposed in nested relation and for rotation about the same axis.

8. A transmission comprising a pair of parallel shafts geared together for simultaneous rotation in opposite directions, each of said shafts having first and second drive gears rotatably journaled thereon and a normally disengaged multiple disc clutch for each gear for selectively coupling such gear to the shaft on which it is journaled for rotation therewith, a double gear, one of which is in mesh with the first drive gear on each parallel shaft, and a set of gears, one of which is in mesh with the second drive gear on each of said parallel shafts, said double gear and set of gears being rotatable about the same center, a shaft having a first gear in mesh with one of the gears of said double gear and a second gear in mesh with the other of the gears of said double gear, and a second shaft having a first gear in mesh with one of the gears of said set of gears and a second gear in mesh with the other of the gears of said set.

9. A multi-speed forward and reverse transmission and axle comprising a pair of parallel driving shafts geared together for simultaneous rotation in opposite directions and having forward and reverse drive gears rotatably journaled thereon, a normally disengaged multiple disc clutch operatively disposed between each of said gears and the shaft on which it is journaled for selectively coupling each of said gears with the shaft on which it is journaled whereby each of said gears may be selectively driven directly by and with the shaft on which it is journaled, two sets of gears rotatable about a common center and drivingly connected to said forward and reverse drive gears so as to be driven thereby from said parallel shafts under the control of said clutches, a pair of multi-speed shafts, each having high and low speed gears thereon geared with the gears of one of said sets of gears, and a normally disengaged multiple disc clutch operatively disposed between each of said high and low speed gears and the shaft on which it is journaled for selectively coupling each multi-speed shaft with the gears thereon, and an axle geared to each of said multi-speed shafts, said axles being aligned.

10. A transmission and axle according to claim 9 wherein one of said gear sets is rotatable relative to the other.

11. A transmission and axle according to claim 9 wherein one of the gears of one of said sets is geared to said forward and reverse gears, and two-speed gearing is operatively disposed between said gear sets for driving the other of said sets of gears.

12. A transmission and axle according to claim 9 wherein said two sets of gears are mounted on and fixed to a single shaft.

13. A transmission and axle according to claim 9 wherein one of the gears of each of said sets is geared to said forward and reverse gears.

14. A multi-speed forward and reverse transmission and axle comprising a pair of parallel shafts geared together for simultaneous rotation in opposite directions, one shaft having first and second forward drive gears rotatably journaled thereon and the other shaft having first and second reverse drive gears rotatably journaled thereon, a normally disengaged, hydraulically actuated, multiple disc clutch operatively disposed between each of said gears and the shaft on which it is journaled for rotation for selectively coupling each shaft with the gears thereon, two sets of gears rotatable relative to each other about a common center, the gears of one set being geared to said forward and reverse drive gears so as to be driven thereby from said parallel shafts under the control of said clutches, a pair of two-speed shafts, each having high and low speed gears thereon geared with the gears of the other one of said sets of gears, a normally disengaged, hydraulically actuated, multiple disc clutch operatively disposed between each of said gears on said two-speed shafts and the shaft on which it is journaled for selectively coupling each shaft with the gears thereon, an axle geared to each of said two-speed shafts, said axles being aligned, and means for drivingly interconnecting said sets of gears so as to drive said other set of gears from said one set of gears.

15. A multi-speed forward and reverse steering type transmission comprising a pair of parallel driving shafts geared together for simultaneous rotation in opposite directions, each shaft having first and second drive gears rotatably journaled thereon, a normally disengaged multiple disc clutch operatively disposed between each of said gears and the shaft on which it is journaled for rotation for selectively coupling each shaft with the gears thereon whereby each of said gears may be selectively driven directly by and with the shaft on which it is journaled, two of said gears being forward drive gears and two of said gears being reverse drive gears, a plurality of distributing gears rotatable about a common center and coupled to said forward and reverse drive gears so as to be driven thereby from said parallel shafts under the control of said clutches, a pair of output shafts, each geared with one of said distributing gears, and an axle geared to each of said output shafts, said axles being aligned.

16. A multi-speed forward and reverse transmission and axle comprising an input shaft, selectively operable forward and reverse gearing driven thereby, axially aligned axles, a two-speed shaft coupled with each of said axles for driving the same and having high and low speed gears journaled thereon, a normally disengaged, hydraulically actuated, multiple disc clutch operatively disposed between each of said high and low speed gears and the shaft on which it is journaled, and distributing gearing operatively disposed between said forward and reverse gearing and the high and low speed gears on said two-speed shafts, said distributing gearing comprising two sets of gears geared with said forward and reverse gearing so as to be driven thereby, said sets of gears being journaled about the same center, the low and high speed gears of each two-speed shaft being geared with the gears of one of said sets of gears.

17. A transmission and axle according to claim 16 wherein one of said gear sets is rotatable relative to the other.

18. A transmission and axle according to claim 16 wherein said gear sets are rotatable relative to each other and drivingly connected in series.

19. A multi-speed forward and reverse transmission and axle comprising an input shaft, selectively operable forward and reverse gearing driven thereby and including clutches for controlling said gearing, axially aligned driving axles, a two-speed shaft coupled with each of said axles for driving the same and having high and low speed gears journaled thereon, a normally disengaged clutch operatively disposed between each of said high and low speed gears and the shaft on which it is journaled, and distributing gearing operatively disposed between said forward and reverse gearing and the high and low speed gears on said two-speed shafts, said distributing gearing comprising a plurality of gears driven by said forward and reverse gearing and journaled about the same axis, the low and high speed gears of each two-speed shaft being geared with said gears of said distributing gearing independently of the gears of the other two-speed shaft, each of said clutches comprising a normally disengaged, hydraulically actuated, multiple disc clutch, said input and two-speed shafts being disposed parallel to said axis, said two-speed shafts and said axles being symmetrically disposed relative to said axis.

20. A multi-speed forward and reverse transmission comprising an input shaft, clutch controlled selectively operable forward and reverse gearing driven thereby, a pair of output shafts, each having high and low speed gears journaled thereon, a normally disengaged clutch operatively disposed between each of said high and low speed gears and the shaft on which it is journaled, and distributing gearing operatively disposed between said forward and reverse gearing and the high and low speed gears on said output shafts, said distributing gearing comprising two sets of gears coupled with said forward and reverse gearing so as to be driven thereby, said sets of gears being journaled about the same center one around the other and so as to be rotatable relative to each other, the low and high speed gears of each output shaft being geared with the gears of one of said sets of gears.

21. A transmission according to claim 20 wherein the gears on one of said output shafts are geared to one of said sets of gears while the gears on the other of said output shafts are geared to the other of said sets of gears.

22. A transmission comprising a pair of parallel shafts geared together for simultaneous rotation in opposite directions, drive gears rotatably journaled thereon, a normally disengaged multiple disc clutch operatively disposed between each of said gears and the shaft on which it is journaled for selectively coupling said shafts with the gears thereon, an intermediate shaft having a first gear in mesh with one gear on each of said parallel shafts and a second gear, a double gear journaled on said intermediate shaft and arranged to be driven from said second gear, a pair of two-speed shafts, each having a high speed gear and a low speed gear journaled thereon, said high speed gears being geared to one of said double gears and said low speed gears being geared to the other of said double gears, a normally disengaged clutch operatively arranged between each of said high and low speed gears and the shaft on which it is journaled, and a pair of axles arranged in line, one being drivingly coupled to each of said two-speed shafts.

23. A transmission comprising a pair of parallel shafts geared together for simultaneous rotation in opposite directions, each shaft having first and second drive gears rotatably journaled thereon, a normally disengaged multiple disc clutch operatively disposed between each of said gears and the shaft on which it is journaled for selectively coupling each shaft with the gears thereon, an intermediate shaft having a first gear adapted to be driven by one gear on each of said parallel shafts and a second gear adapted to be driven by the other of said gears on said parallel shafts, a double gear journaled on said intermediate shaft and arranged to be driven thereby, a pair of output shafts, each having a high speed gear and a low speed gear journaled thereon, said high speed gears being arranged so as to be driven by one of said double gears and said low speed gears being arranged so as to be driven by the other of said double gears, and a normally disengaged clutch operatively arranged between each of said high and low speed gears and the shaft on which it is journaled.

24. A transmission comprising a pair of parallel shafts geared together for simultaneous rotation is opposite directions, each shaft having first and second drive gears rotatably journaled thereon, a normally disengaged multiple disc clutch operatively disposed between each of said gears and the shaft on which it is journaled for selectively coupling each shaft with the gears thereon, an intermediate shaft having a first gear in mesh with one gear on each of said parallel shafts and a second gear, a double gear journaled on said intermediate shaft and having on of its gears in mesh with one gear on each of said parallel shafts, a pair of two-speed shafts, each having a high speed gear and a low speed gear journaled thereon, said high and low speed gears on one shaft being geared to said double gears and said high and low speed gears on the other shaft being geared to the gears on said intermediate shaft, a normally disengaged clutch operatively arranged between each of said high and low speed gears and the shaft on which it is journaled, and a pair of output shafts arranged in line, one being drivingly coupled to each of said two-speed shafts.

25. A multi-speed forward and reverse steering type transmission comprising a pair of parallel shafts geared together for simultaneous rotation in opposite directions, each shaft having first and second drive gears rotatably journaled thereon, a normally disengaged multiple disc clutch operatively disposed between each of said gears and the shaft on which it is journaled for selectively coupling each shaft with the gears thereon, two of said gears being forward drive gears and two of said gears being reverse drive gears, a distributor shaft having one gear in mesh with a gear on each of said parallel shafts and a second gear in mesh with the other gear on each of said shafts, a pair of two-speed shafts, each having high and low speed gears thereon geared to said distributor shaft in such a manner that said high speed gears are geared together and said low speed gears are geared together, a normally disengaged multiple disc clutch operatively disposed between each of said high and low speed gears and said two-speed shafts for selectively coupling each of said shafts with the gears thereon, and an output shaft geared to each of said two-speed shafts, said output shafts being aligned.

26. A multi-speed forward and reverse steering type transmission comprising a pair of parallel driving shafts geared together for simultaneous rotation in opposite directions, drive gears rotatably journaled thereon, a normally disengaged multiple disc clutch operatively disposed between each of said gears and the shaft on which it is journaled for selectively coupling said shafts and gears whereby each of said gears may be selectively driven directly by and with the shaft on which it is journaled, a distributor shaft having gears thereon arranged to be driven from the gears on said parallel shafts, a pair of two-speed shafts, each having high and low speed gears thereon geared to gears on said distributor shaft so as to be driven thereby, a normally disengaged multiple disc clutch operatively disposed between each of said high and low speed gears and said two-speed shafts for selectively coupling each of said shafts with the gears thereon, and an axle geared to each of said two-speed shafts, said axles being aligned, said distributor shaft being disposed parallel to said other shafts, said shafts, clutches and gears being arranged so that said axles may be driven in each direction at the same or different relative speeds.

27. A multi-speed forward and reverse steering type transmission comprising a pair of parallel driving shafts geared together for simultaneous rotation in opposite directions, each shaft having first and second drive gears rotatably journaled thereon, a normally disengaged multiple disc clutch operatively disposed between each of said gears and the shaft on which it is journaled for selectively coupling each shaft with the gears thereon whereby each of said gears may be selectively driven directly by and with the shaft on which it is journaled, two of said gears being forward drive gears and two of said gears being reverse drive gears, a distributor shaft having one gear coupled with a gear on each of said parallel shafts and a second gear coupled with the other gear on each of said shafts, a pair of two-speed shafts, each having high and low speed gears thereon coupled with the gears on said distributor shaft, a normally disengaged multiple disc clutch operatively disposed between each of said high and low speed gears and said two-speed shafts for selectively coupling each of said shafts with the gears thereon, and an axle geared to each of said two-speed shafts.

28. A multi-speed forward and reverse transmission comprising a pair of parallel unidirectional driving shafts geared together for simultaneous rotation in opposite directions and having two forward drive gears rotatably journaled on one shaft and two reverse drive gears rotatably journaled on the other shaft, a normally disengaged clutch operatively disposed between each of said gears and the shaft on which it is journaled for selectively coupling each of said gears with the shaft on which it is journaled whereby each of said gears may be selectively driven directly by and with the shaft on which it is journaled, a countershaft coupled to said forward and reverse drive gears so as to be selectively driven thereby in opposite directions from said parallel shafts under the control of said clutches, a clutch shaft having high and low speed gears journaled thereon and adapted to be driven from said countershaft, a normally disengaged clutch operatively disposed between each of said high and low speed gears and said clutch shaft for selectively coupling said clutch shaft with the gears thereon, and an output shaft geared to said clutch shaft.

29. A transmission according to claim 28 wherein said countershaft is coupled to said forward and reverse drive gears by gears fixed to said countershaft for rotation therewith in constant mesh with said forward and reverse drive gears on said unidirectional shafts and wherein a gear on said countershaft is in constant mesh with a gear on said clutch shaft.

30. A multi-speed forward and reverse transmission comprising a pair of parallel unidirectional driving shafts geared together for simultaneous rotation in opposite directions, two forward drive gears rotatably journaled on one shaft and two reverse drive gears rotatably journaled on the other shaft, a normally disengaged multiple disc clutch operatively disposed between each of said gears and the shaft on which it is journaled for selectively coupling each of said gears with the shaft on which it is journaled whereby each of said gears may be selectively driven directly by and with the shaft on which it is journaled, a countershaft having gears rotatable therewith drivingly connected to said forward and reverse drive gears so as to be selectively driven thereby in opposite direction from said parallel shafts under the control of said clutches, a clutch shaft having high and low speed gears journaled thereon, a normally disengaged multiple disc clutch operatively disposed between each of said high and low speed gears and said clutch shaft for selectively coupling said clutch shaft with the gears thereon, an output shaft, said clutch shaft and said gears thereon forming part of a multispeed gear train between said countershaft and output shaft whereby the latter may be selectively driven at various speeds relative to said countershaft.

References Cited in the file of this patent
UNITED STATES PATENTS

| 1,844,237 | Becker | Feb. 9, 1932 |
| 1,987,006 | Foster | Jan. 8, 1935 |
| 2,866,350 | Gerst | Dec. 30, 1958 |

FOREIGN PATENTS

| 341,212 | Germany | Sept. 29, 1921 |
| 717,450 | Great Britain | Oct. 27, 1954 |